US007346954B2

(12) United States Patent
Weber et al.

(10) Patent No.: US 7,346,954 B2
(45) Date of Patent: Mar. 25, 2008

(54) ARRANGEMENT FOR CLEANING SURFACES WITH CLEANING EQUIPMENT HAVING A CLEANING BELT

(75) Inventors: Martin Weber, Kirchzarten (DE); Claus G. Wandres, Stegen (DE)

(73) Assignee: Wandres GmbH micro-cleaning, Buchenbach-Wagensteig (DE)

( * ) Notice: Subject to any disclaimer, the term of this patent is extended or adjusted under 35 U.S.C. 154(b) by 608 days.

(21) Appl. No.: 10/881,927

(22) Filed: Jun. 30, 2004

(65) Prior Publication Data

US 2005/0005374 A1 Jan. 13, 2005

(30) Foreign Application Priority Data

Jun. 30, 2003 (DE) ................................ 103 29 499

(51) Int. Cl.
*B60S 3/04* (2006.01)
*B08B 1/04* (2006.01)

(52) U.S. Cl. ............................ 15/53.1; 15/21.1; 15/77; 15/88.2; 15/97.1; 15/97.3; 15/102

(58) Field of Classification Search ................. 15/21.1, 15/22.3, 53.1, 77, 80, 88.2, 97.1, 97.3, 99, 15/102
See application file for complete search history.

(56) References Cited

U.S. PATENT DOCUMENTS

| | | | |
|---|---|---|---|
| 1,995,685 A | 3/1935 | Perkins | |
| 2,312,186 A * | 2/1943 | Paddock et al. | 15/77 |
| 2,828,501 A | 1/1958 | Brown, Sr. | |
| 3,678,527 A * | 7/1972 | Ries | 15/97.3 |
| 3,709,184 A * | 1/1973 | Laney | 114/222 |
| 3,928,884 A * | 12/1975 | Sutter | 15/88.3 |
| 5,507,876 A | 4/1996 | Wandres | |
| 5,943,725 A * | 8/1999 | Wandres | 15/77 |

FOREIGN PATENT DOCUMENTS

| | | |
|---|---|---|
| AT | 359 858 | 12/1980 |
| DE | 2 060 377 | 6/1971 |
| DE | 1 752 264 | 12/1971 |
| DE | 2407117 | * 3/1975 |
| DE | 2349696 | * 4/1975 |
| DE | 2928630 | * 2/1980 |
| DE | 33 33 175 | 11/1984 |

(Continued)

*Primary Examiner*—Mark Spisich
(74) *Attorney, Agent, or Firm*—Volpe and Koenig, PC

(57) ABSTRACT

An arrangement (1) for cleaning surfaces (2), particularly curved or arched or wavy surfaces and/or surfaces (2) with varying direction of curvature, for example on vehicle chassis, metal strip or unflat plates. The arrangement has a cleaning device (3) having a tension resistant carrier band or belt with an upper section and a lower section and also at least two reversing rollers or rolls (4), which device acts with a section as a cleaning belt section (6) on the surface to be cleaned (2) with its inner side facing the reversing rollers or rolls (4). The device (1) has a presser device (8) with a guide (9) for the cleaning belt section (6), through which the cleaning belt section (6) can be pressed. It is provided that the presser device (8) includes at least one flexible cushion or buffer (10), and that the guide (9) acted on thereby is deflectable or bendable transversely to, or at right angles to, the surface to be cleaned (2).

20 Claims, 2 Drawing Sheets

FOREIGN PATENT DOCUMENTS

| | | | |
|---|---|---|---|
| DE | 100 65 531 | | 7/2002 |
| EP | 174294 | * | 9/1985 |
| EP | 0 813 914 B1 | | 3/1997 |
| GB | 158319 | | 1/1921 |
| JP | 07 016 527 | | 1/1995 |

* cited by examiner

ARRANGEMENT FOR CLEANING SURFACES WITH CLEANING EQUIPMENT HAVING A CLEANING BELT

BACKGROUND

The invention relates to an arrangement for cleaning surfaces, particularly curved, arched or wavy surfaces and/or surfaces having a changing direction of curvature, for example, on vehicle chassis, metal strip, or unflat plates, with a cleaning device, having an upper section and a lower section and also at least two reversing rollers, which acts with one belt section as the cleaning belt section on the surface to be cleaned, and is fastened at its inner side facing the reversing rollers or rolls to a tension-resistant carrier band or belt, the device having a presser device with a guide for the cleaning belt section, by means of which the cleaning belt section can be pressed against the surface to be cleaned.

Such an arrangement is known, for example from EP 0 813 914 B1, and has proved itself for the cleaning of flat surfaces. Such an arrangement is described in column 1, line 48 through column 2, line 6, as a cleaning device with a belt section as a cleaning section which acts on the surface to be cleaned, and with a presser arrangement on the device that is provided with a guide for the cleaning section.

However, many surfaces to be cleaned have no planar geometry, but are for example curved, convex, or wavy. Such surfaces are frequently found in chassis building in the automobile industry, or in the production of steel sheets before processing by subsequent aligning and smoothing processes. Rotating, cylindrical brushers or brush rollers are frequently used in the cleaning of such uneven surfaces.

In these heretofore known cleaning arrangements for surfaces, the problem exists that the device is brought near the respective surface at a given, predeterminable distance, and the cleaning process is then performed at this distance. Already with regularly curved or wavy surfaces, in particular also with a geometry which changes over the surface, there can thus be unsatisfactory cleaning results, since firstly the bristles or brush filaments at a given selected distance can be deformed such that they cover the wavy surface to be cleaned with a considerable portion of their length or else on the other hand do not contact the surface at all in a given region because of the changing distance.

SUMMARY

The object therefore exists of developing an arrangement of the kind mentioned at the beginning so that this is adaptable to a curved, arched, or wavy surface, and/or to surfaces to be cleaned with changing curvature, and in spite of the irregular geometry of the surface to be cleaned, an at least extensively uniform cleaning result can be attained.

To attain this object, the arrangement according to the invention includes a presser device formed as at least one flexible cushion, and that the guide thereby acted upon is deflectable or bendable transversely of, or at right angles to the surface to be cleaned. The cleaning belt section is thereby pressed by means of the presser device against the wavy surface, whereby, due to the flexibility of the cushion or buffer, there occurs adaptation of the same together with the guide and the cleaning belt section to the contour of the surface to be cleaned. Together with the flexibility of the guide, the resilience of the cushion or buffer effects a substantially uniform pressing force on the surface located under the cleaning belt section, which in turn leads to the brushes or brush filaments contacting the surface to be cleaned only with their tips, so that an optimum cleaning result is obtained using brushes. The wiping elements to be used can however be of another kind, e.g. fibers or bonded fibers.

In order to ensure, at each position of the cleaning belt section guide to be acted on, an optimum seating of the cushion(s), and thereby to attain an optimum uniform pressing force, the cushions can have a flexible and/or resilient covering. By this means, with complete or partial filling with at least one medium, the cushion(s) can be able to adapt without problems to the contour predetermined by the surface, by means of an escape of the medium or a yielding of the covering of the same.

In addition, a further improvement of the capability of the presser device to adapt and for the case that a local control is provided on this, several cushions can be arranged near, behind and/or one above the other.

For filling the cushion, appropriately in the device according to the invention a flexible or distributable material, for example a granulate or bulk material, a liquid or gaseous medium, for example a gel or water or air, or an optional combination of these components, can be provided. Furthermore, the cushion or the buffer, also possibly formed of a foam material of predetermined resilience, is supported and/or braced, and its property of returning to its original shape leads to the desired adaptability and pressing force.

Furthermore, the cushion(s) are appropriately supported and/or braced on their boundaries arranged transverse to or at right angles to the surface to be cleaned, so that the pressing direction remains stationary at its predetermined place within the device and does not undesirably deform or escape into other regions of the device.

Appropriately in one embodiment the deflectable or bendable guide receiving the cleaning belt section is connected to at least one support element which extends in a direction transverse to or at right angles to the surface to be cleaned and to the cleaning belt section and is displaceably guided in this direction. In this manner, it is ensured at all times that the guide of the cleaning belt section remains in contact with the presser device acting on it and thus reacts to changing geometries of the surface to be cleaned. For this purpose, and for lateral reinforcement or support, providing a telescopic guide is particularly preferred.

To be able to react particularly flexibly to changing geometries of the surface to be cleaned, it is appropriate in the device according to the invention if the interior of the cushion(s) has a pressure regulation with which the interior pressure of the cushion can be kept constant or regulated for different deformations. The force exerted on the guide, besides the force exerted by the presser device, can thereby be kept to a level independent of the surface geometry, or else regulated dependent on the geometry. Additionally to this, or optionally instead of this pressure regulation, a compensating container for the medium filling the cushion may be provided into which the medium can escape, for example with only small flexibility of the jacketing. At the same time it can also be provided that the forces occurring between the surface and the presser device are exclusively compensated by the flexibility or the resilience of the covering itself.

So that the guide of the cleaning belt section can complete the required movements for adaptation to the surface to be cleaned, the guide for the cleaning belt section advantageously has a substantially U-shaped or C-shaped cross section and is composed of elements which are connected together and are pivotable relative to one another, or which are integrally formed of such relatively bendable elements.

The U-shaped or C-shaped profiled guide as a rule engages over an edge region of a carrier belt provided with cleaning bristles, the engagement over both longitudinal edges of the guide resulting in symmetrical guiding with secure mounting of the cleaning device during its operation, as well as an easy exchange when the belt is correspondingly worn, since the substitute part can easily be threaded into the guide.

In order for the movements of the cleaning belt section to be easily performed later on adapting to different surfaces to be cleaned, it can advantageously be provided that the U-shaped or C-shaped legs of the guide have slots facilitating their opposite pivoting on deflection or bending of the guide. The legs can thus respectively individually execute a pivoting movement one against the other and follow the course of the surface profile.

The different length structure of the cleaning belt section due to adapting to the surface to be cleaned can be taken into account in that at least one of the reversing rollers or rolls is mounted displaceably against a restoring force. By the application e.g. of a return spring with a given spring path in the length direction of the cleaning belt section to one of the reversing rollers, a length compensation occurs which is necessary due to the pressing of the device in an outward-curved surface, since the carrier belt of the cleaning device is resistant to tension.

It is advantageous during the cleaning process of the cleaning device to remove as completely as possible the entrained dirt particles released by the bristles, so that these are not carried back to be re-deposited on the surface. For this purpose in one embodiment of the invention the cleaning device can be provided as a linear brush with a carrier belt running in the guide and bristles upstanding from it, and a stripping element can be provided, particularly rotating or ledge-shaped, with its surface toward the cleaning device in the use position having a distance from the carrier belt which is smaller than the bristle length, so that the stripping element engages between bristle ends when in use, the stripping element being arranged outside the cleaning region, in particular on or in a region of a reversing roller or roll. By the engagement of the striping element in the bristles, dirt particles can be released from these and carried away from there.

For rapid conducting away of the particles from the region of the cleaning belt section, a suction device for removal of particles taken from the bristles can be provided in the direction of advance of the cleaning device, or of the linear brushes behind the cleaning area, particularly on the reversing roller or roll. Once released from the bristles, the particles are directly taken up and removed by the suction stream acting on this region. The suction device is generally arranged in the region of the stripper elements in order to keep the transport path small in the region of the cleaning device.

The uptake of particles can be improved by the wetting of bristles on the cleaning device, since the moisture leads to a higher adhesion to the bristles. Hence a wetting device, preferably a spray device, is provided in the direction of movement of the cleaning device, in a further appropriate embodiment of the device according to the invention.

In particular with surfaces of large extent, for example, large plates or endless belts, cleaning of the whole surface can take place only during a suitable time period if the surface is moved with respect to the cleaning device in an advance direction on a device provided for it such that continuous cleaning takes place. Hence, in a preferred embodiment of the invention, the cleaning device or the linear brush is moved transversely of the direction of advance of the surface to be cleaned, in particular arranged at right angles to this direction of advance, and revolves, and/or the cleaning device or the linear brush is movable transversely to, or at right angles to, its direction of revolution relative to the surface to be cleaned.

It is particularly preferred if the relative movement between the cleaning device or linear brush and the surface to be cleaned is a linear or a curved movement or a pivoting movement, which as a continuous movement is particularly suitable for a cleaning process to be continuously performed with a cleaning device abutting on the surface. A linear brush when used is thus—as already mentioned—moved transversely of the direction of advance of the surface to be cleaned, always back and forth over the surface to be cleaned. In this manner the cleaning process is not interrupted. By corresponding speeds of advance of the surface to be cleaned and/or the cleaning device, the intensity of the cleaning can hereby also be affected.

In order also to be able to undertake in particular continuous cleaning of surfaces which have a trough-like profile and are thus concave with respect to the cleaning device, the cross section and/or the longitudinal section of the cleaning belt section can be convexly curved at least locally. This region can also extend over the whole cleaning belt section, which then has overall convex curvature. This convex prestressing of the cleaning device is attained by a corresponding action of the presser device, which can be adjusted by means of the already described pressure regulation.

A more reliable handling with the device, which simultaneously permits a defined action on the surface to be cleaned, is attained with the device according to the invention in that it has a junction coupling for connecting with a manipulation device or robot. Such a robot, after joining to the said coupling, is for example able to move and pivot the device in optional directions relative to the surface. Moreover this coupling facilitates, in particular when a standardized or standard coupling is concerned, the integration of the cleaning device into already existing production and finishing processes, in which a cleaning at given times is desirable.

In order to obtain for the respective manipulation device or robot its complete freedom of movement and to accommodate no interfering objects in the region of the surface to be cleaned, the junction coupling is arranged near the drive motor for the linear brush and/or the drive motor for one of the reversing rollers or rolls and the cleaning device with its belt section extends away from the junction coupling. Thus actually only the cleaning device with its belt sections project away from the coupling into the region of the surface to be cleaned, while the drive motor is arranged near the coupling, which gives a favorable weight distribution. Thus the device can also find use on production robots with more complicated courses of movement,

BRIEF DESCRIPTION OF THE DRAWINGS

An exemplary embodiment of the invention is described hereinafter with the aid of the drawings, in schematic representation.

DETAILED DESCRIPTION OF THE PREFERRED EMBODIMENTS

Figures 1, 2, 3:
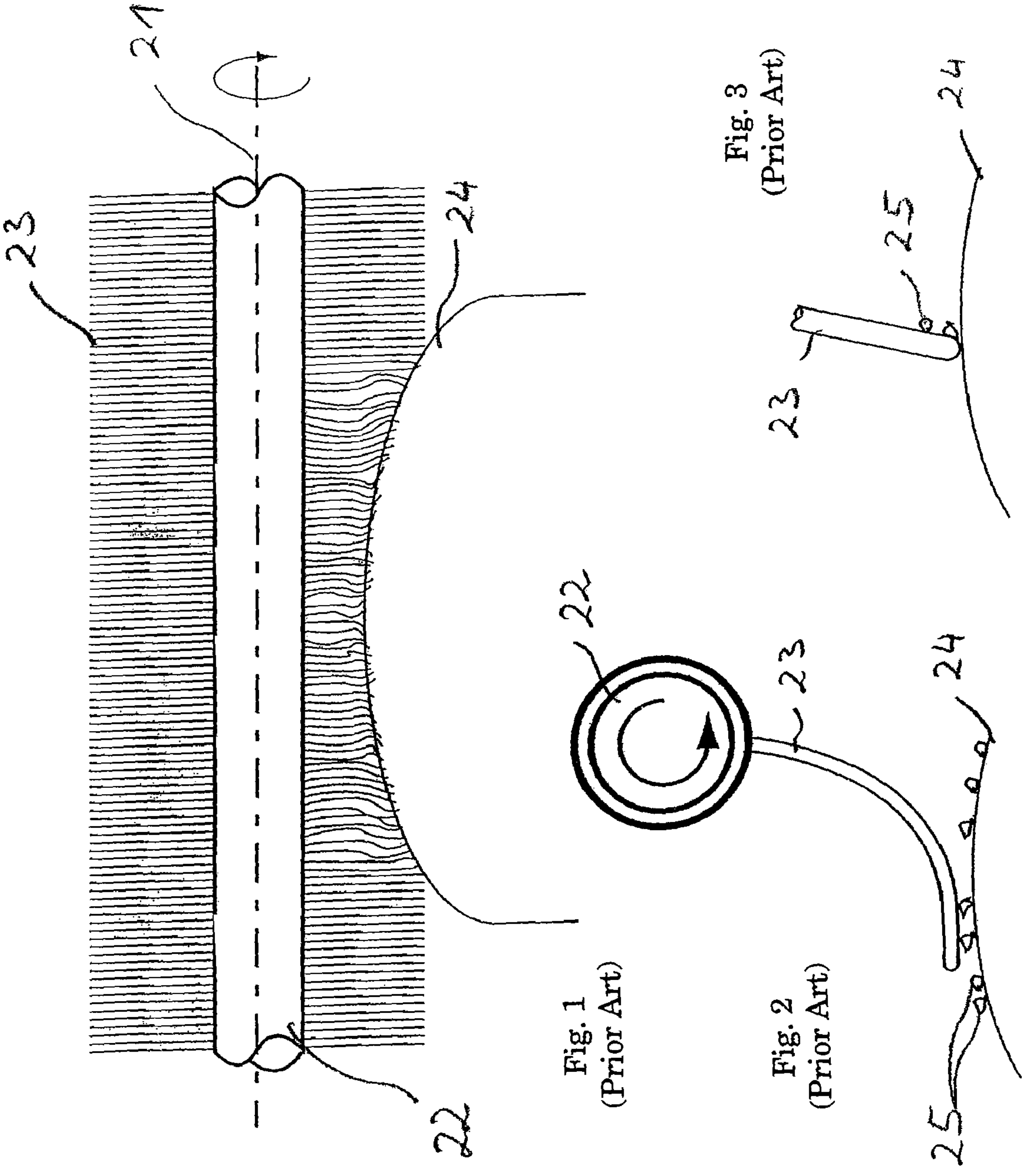
Fig. 1 (Prior Art)
Fig. 2 (Prior Art)
Fig. 3 (Prior Art)
FIG. 1 is a side view of a brush roller known from the prior art, which abuts with its bristles a convex arched surface.
FIG. 2 is a greatly schematized cross section of the brush roller of FIG. 1 showing only a single bristle arranged thereon, which abuts with a portion of its longitudinal side on the surface to be cleaned, here shown sectionally, and takes up or wipes over particles.
FIG. 3 is a view that shows the region at a free end of a cleaning bristle, which exactly contacts the surface to be cleaned with its tip.

The arrangement shown in FIG. 1 can be used to explain the prior art device. Seen here is a brush roller 22 extending along an axis 21 and having bristles 23 extending radially from it and being rotated around the axis 21 in the direction of the arrow. This brush roller 22 is brought close, at a given distance, to the convex surface to be cleaned 24, so that the bristles 23 contact the surface 24. Based on the geometry of the surface 24, thus on its curvature in the direction toward the roller 22, the brushes 23 undergo a differently strong loading or curvature according to the place of the radius of curvature of the surface 24 where they are located.

Through examination of a single bristle 23, this can be gathered for the sake of example from FIG. 2, in which this is shown standing out substantially radially from the brush roller 22. The region of the free end of the bristle then covers a section of the portion of the surface shown here, which depends on the distance of the brush roller 22 from the surface 24 and on the flexibility of the bristle 23. The bristle is hereby moved over the surface 24, by the rotation of the brush roller 22 in the direction of the arrow, leading to a partial removal of the particles 25 located on the surface 24 and to their being transported away. Since the brush 23 shown wipes away due to its bending around here substantially over the surface section, it partially slides over the particles 25 instead of removing these.

A better removal of particles 25, and connected with this a good cleaning power of a bristle 23 abutting a surface to be cleaned 24 is attained in the situation shown in FIG. 3, namely, when the bristle 23 contacts with its end the surface 24, and thereby with its tip can engage the respective particles 25, and can then transport these away.

Figure 4:
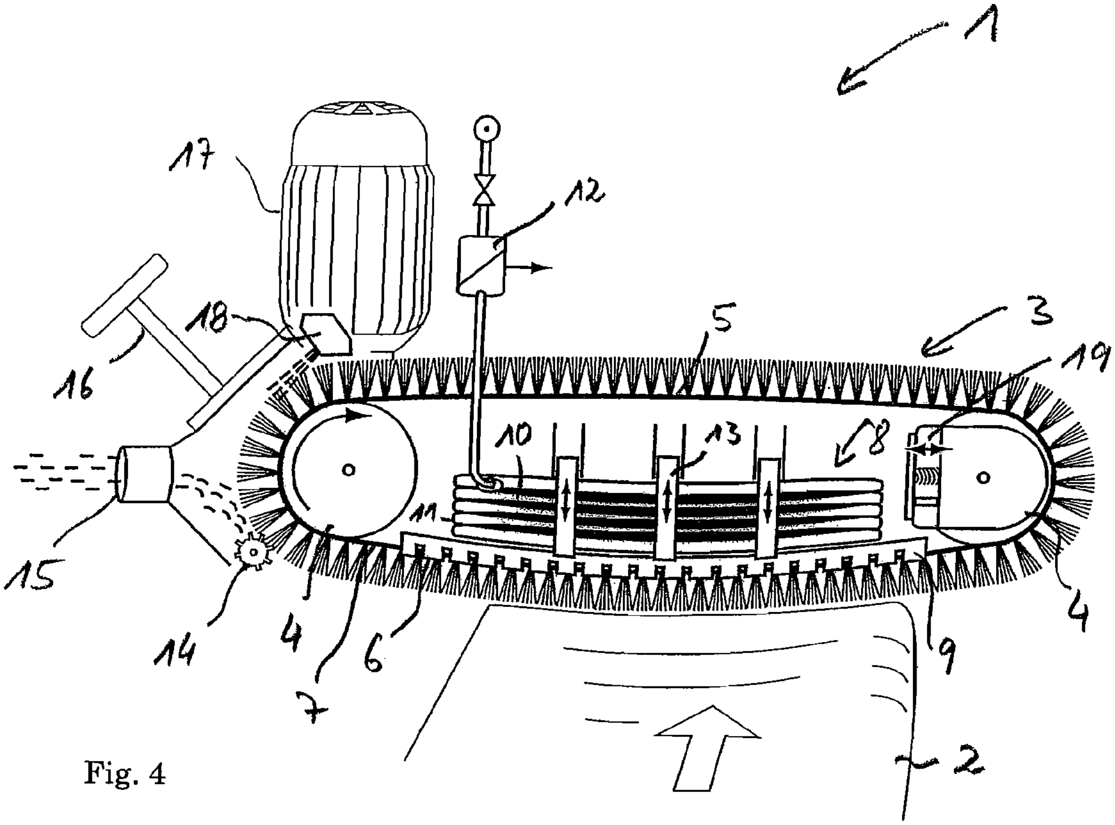
FIG. 4 is a side view of an arrangement according to the invention with a cleaning device with an upper belt section and a lower belt section constructed as an endless belt circulating around two reversing concave curved surface to be cleaned by a presser device constructed as a flexible, concave curved cushion, the object having the surface to be cleaned being moved transversely to the cleaning belt section.
Figure 5:
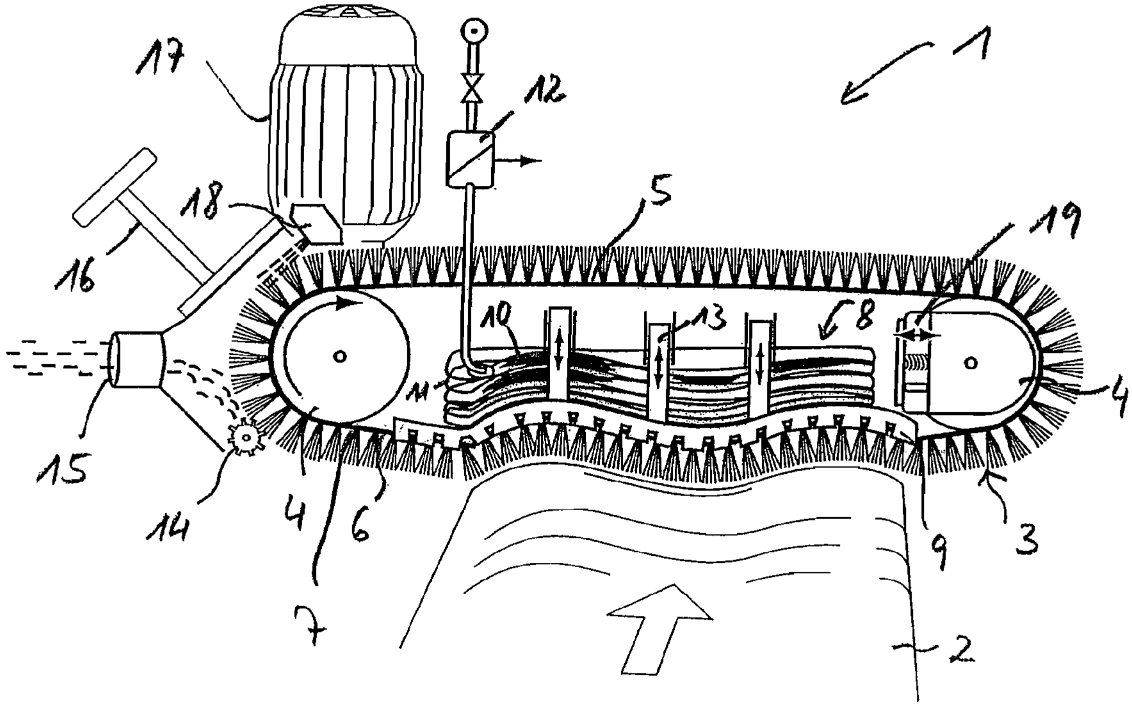
FIG. 5 is a view of the arrangement analogous to FIG. 4, which cleans a surface in another form, namely wavy, that is moved past it.

FIGS. 4 and 5 show an arrangement according to the invention, denoted overall by 1, which for removal of particles 25 (see FIGS. 2 and 3) particularly from curved, arched, or wavy surfaces 2 by a cleaning device 3, a relative movement between this and the surface 2 taking place, existing as represented be a respective arrow giving the direction of movement of the surface 2. The cleaning device 3 contacts the surface 2, whereby the particles 25 adherent to or on the surface 2 are removed and carried way from the cleaning device 3.

In both exemplary embodiments, the arrangement 1 has an endless revolving cleaning device 3 guided around reversing rollers 4, with an upper section 5 and a lower section as cleaning belt section 6. The cleaning belt section 6 acts on the surface to be cleaned. At its inner side facing the reversing rollers 4, the cleaning device 3 comprises a tension-resistant carrier belt 7, and the arrangement 1 has a presser device 8 with a guide 9 for the cleaning belt section 6, through which the cleaning belt section 6 can be pressed onto the surface to be cleaned 2. The guide 9 is formed by U-shaped legs arranged one behind the other in the direction of the cleaning belt section 6, and having slots so that they are individually mutually pivotable upon a deflection or bending of the guide. The presser device 8 is formed as a flexible cushion 10 and the guide 9 on which it acts is deflectable or bendable transversely to or at right angles to the guide 9 on which it acts.

Upon a movement of the reversing rollers 4 in the direction indicated by the arrow, the cleaning device accordingly moves endlessly around the reversing rollers 4 and is pressed against the surface 2 in the region of the cleaning belt section 6 by the presser device 8. The present integrally formed cushion 10 of the presser device 6 has a flexible jacketing 11, and the pressure of the medium located within the jacketing 11 is regulated by a pressure regulating device 12. In addition, the guide 9 of the cleaning belt section 6 is connected to a telescopic support element 13 which extends in a direction transverse to or at right angles to the surface to be cleaned 2 and the cleaning belt section 6, and is variably guided in this direction by the displacement guide allocated to it, so that the presser device 8 executes in all a defined movement and the cushion 10 is then kept stiffened and supported thereby.

In the region of the left-hand reversing roller 4 as seen by an observer, in the region of the cleaning belt section 6, in the direction of its advance according to the surface to be cleaned 2, a stripper device 14 is arranged, past which the bristles of the cleaning device 3 are moved, so that the particles 25 are dislodged. Directly connected thereto can be seen the conical end, that extends away from the device, of a suction device 15 through which the dislodged particles 25 are conducted away from the device.

The drive motor 17 is located near the junction coupling 16 of the device 1, likewise in the region of the left-hand reversing roller 4, with an upright standing axis and a gear (not visible) for converting the drive to the left-hand reversing roller 4. A spray nozzle 18 for moistening the cleaning device 3 can be seen in the region of the cleaning device 3 near the motor 17.

The right-hand (as seen by an observer) reversing roller 4 is acted on by a resetting device in the form of a spring or a roll, so that any length changes of the cleaning device 3 during the cleaning process can be compensated for.

It can be seen in FIG. 4 that the arrangement 1 can be used with the cleaning device 3 for cleaning a curved (concave) surface moving away from it. By means of the cleaning belt section 6 of the cleaning device 3 having at least one convex region in longitudinal section when not in use, the device can immediately move into use after traveling onto the surface to be cleaned 2. Here the cleaning belt section 6 is prestressed with a given pressure by means of being acted on by the presser device 8 arranged behind its guide. This pressure can be optionally set within certain limits by means of the pressure regulating device 12, and holds the medium, located within the jacketing 11, of the cushion 10 of the presser device 8 under this pressure. Supported and guided by the telescopic support element 13, the cleaning belt section 6 assumes an outward arched (convex) shape, which makes possible an adaptation to the surface 2 shown in FIG. 4.

In contrast to this, the adaptation is shown in FIG. 5 of the arrangement 1, otherwise identical to that of FIG. 4, with cleaning device 3 on a surface 2 with varying curvature. The force exerted by the presser device 8 on the guide 9 and the cleaning belt section 6 leads in this case to the curvature of the cleaning belt section 6 changing locally corresponding to the surface 2. The different deflections of the cleaning belt section 6 arising result in a locally different deflection of the cushion 10 and thereby also of the telescopic support element 13. Due to the flexibility of the cushion 10 of the presser device 8 and of the pressure regulating device 12 connected to it, the cleaning belt section 6 is in contact with each region of the surface to be cleaned 2, independently of its shape. An optimum cleaning result can thereby be attained with differently shaped and varying surfaces 2.

The invention described hereinabove accordingly relates to an arrangement 1 for cleaning surfaces 2. These can in particular be surfaces which are curved or arched or wavy and/or variable in their direction, as occur, for example, on vehicle chassis, metal strip, or unflat plates. The cleaning device 3 is provided with a tension-resistant carrier band or belt with an upper section and a lower section and also at least two reversing rollers or rolls 4, and acting with one section as a cleaning belt section on the surface to be cleaned 2, with its inner side facing toward the reversing rollers or rolls 4. The arrangement 1 has a presser device 8 with a guide 9 for the cleaning belt section 6 through which this can be pressed onto the surface to be cleaned 2. It is provided that the presser device 8 is formed as at least one flexible cushion or buffer and that the guide 9 acted on by this is deflectable or flexible transversely of or at right angles to the surface to be cleaned 2.

The invention claimed is:

1. Arrangement (1) for cleaning curved, arched, wavy and/or surfaces (2) with varying curvature, comprising a cleaning device (3) having a tension carrying band or belt (7) with an upper section (5) and a lower section and at least two reversing rollers or rolls (4), one of the sections acts as a cleaning belt section (6) held against the surface to be cleaned (2), with the belt (7) being carried by the reversing rollers or rolls (4), a presser device (8) with a guide (9) for the cleaning belt section (6) acts on the cleaning belt section (6) to press it onto the surface to be cleaned (2), the presser device (8) includes at least one flexible cushion (10) having a flexible and/or resilient covering (11) which is fillable or filled, partially or completely, with at least one medium, and the guide (9) acted on thereby is deflectable or bendable transversely to, or at right angles to, the surface to be cleaned (2).

2. Arrangement according to claim 1, wherein the presser device (8) includes a plurality of cushions (10) arranged near, behind, and/or one over another.

3. Arrangement according to claim 1, wherein the at least one cushion (10) contains as filling a flexible or distributable material, a granulate or a bulk material, a liquid or gaseous medium, a gel, water or air or a combination thereof.

4. Arrangement according to claim 1, wherein the cushion (10) is supported and/or stiffened on a boundary arranged transversely to or at right angles to the surface to be cleaned (2).

5. Arrangement according to claim 1, wherein the deflectable or bendable guide (9) receiving the cleaning belt section (6) is connected to at least one support element (13) which extends in a direction transverse to or at right angles to the surface to be cleaned (2) and to the cleaning belt section (6), and is adjustably guided in this direction.

6. Arrangement according claim 5, wherein the at least one support element (13), comprises a telescopic guide that at least temporarily stiffens or supports the cushion (10).

7. Arrangement according to claim 1, wherein an interior of the at least one cushion (10) has a pressure regulator (12) with which, with different deformations, an internal pressure of the cushion (10) is regulated.

8. Arrangement according to claim 1, wherein the at least one cushion further includes a compensating container.

9. Arrangement according to claim 1, wherein at least one of the reversing rollers or rolls (4) is displaceably mounted against a restoring force.

10. Arrangement according to claim 1, wherein the cleaning device (3) is a linear brush with the belt running in the guide (9) and bristles upstanding therefrom, and a rotating or ledge-shaped stripper element (14) is provided, whose surface facing the cleaning device (3) in a use position is spaced at a distance from the carrier band which is smaller than a bristle length, so that the stripper element (14) is arranged outside a cleaning region on or in a region of at least one of the reversing rollers or rolls (4).

11. Arrangement according to claim 10, wherein, in a region located behind the cleaning position in a direction of advance of the cleaning device, a suction device (15) is provided for conducting away particles (25) taken off from the bristles.

12. Arrangement according to claim 11, wherein the suction device (15) is arranged in the region of the stripper element.

13. Arrangement according to claim 11, wherein a moistening device (18), comprising a spray device or spray nozzle, is provided in a direction of movement of the cleaning device (3) in front of the cleaning belt section (6).

14. Arrangement according to claim 10, wherein the cleaning device (3) is arranged, and revolves, transversely to a direction of advance of the surface to be cleaned (2), and/or wherein the cleaning device (3) or the linear brush is movable transversely of or at right angles to its direction of revolution relative to the surface to be cleaned (2).

15. Arrangement according to claim 14, wherein a relative movement between the cleaning device (3) and the surface to be cleaned (2) is a linear or curved movement or a pivoting movement.

16. Arrangement according to claim 1, wherein a cross section and/or longitudinal section of the cleaning belt section (6) is at least locally convex arched when not engaged with the surface to be cleaned.

17. Arrangement according to claim 1, further comprising a junction coupling (16) for connection with a manipulation device or a robot.

18. Arrangement according to claim 17, wherein the junction coupling (16) is arranged near a drive motor (17) for a linear brush and/or one of the reversing rollers or rolls (4), and the cleaning device (3) extends with the cleaning belt section away from the junction coupling (16).

19. Arrangement (1) for cleaning curved, arched, wavy and/or surfaces (2) with varying curvature, comprising a cleaning device (3) having a tension carrying band or belt (7) with an upper section (5) and a lower section and at least two reversing rollers or rolls (4), one of the sections acts as a cleaning belt section (6) held against the surface to be cleaned (2), with the belt (7) being carried by the reversing rollers or rolls (4), a presser device (8) with a guide (9) for the cleaning belt section (6), the guide is substantially U or C-shaped and is formed of members that are connected together and pivotable relative to one another, or are integral and bendable relative to one another, and acts on the cleaning belt section (6) to press it onto the surface to be cleaned (2), the presser device (8) includes at least one flexible cushion (10), and the guide (9) acted on thereby is deflectable or bendable transversely to, or at right angles to, the surface to be cleaned (2).

20. Arrangement according to claim 19, wherein U or C leg portions of the guide (9) include slots to allow an opposite pivoting upon deflecting or bending of the guide.

* * * * *